S. F. MILLER.
SIPHON.
APPLICATION FILED JULY 15, 1908.
931,453.  Patented Aug. 17, 1909.
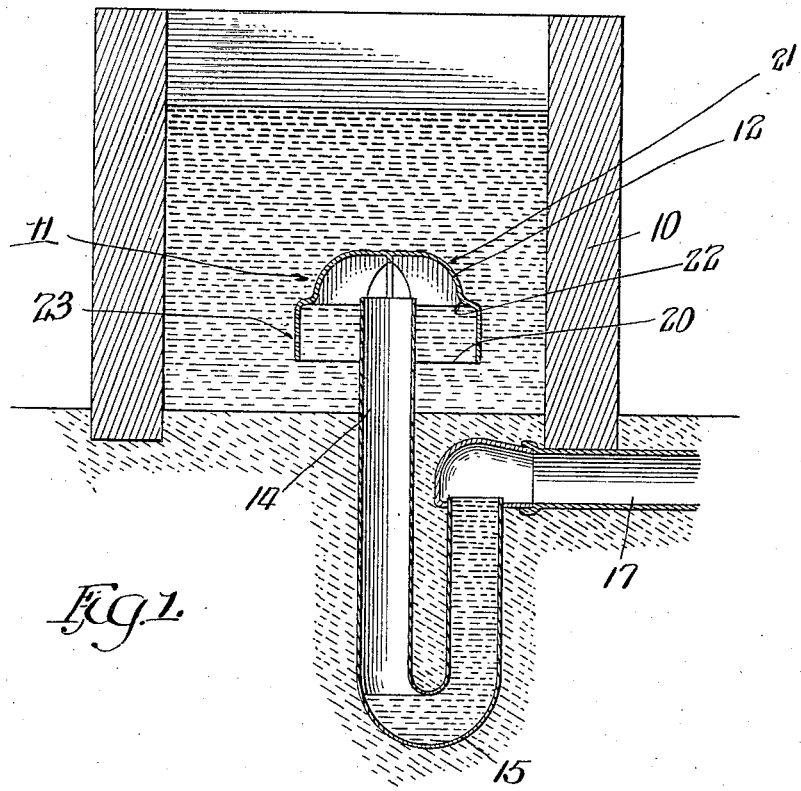
Fig. 1.
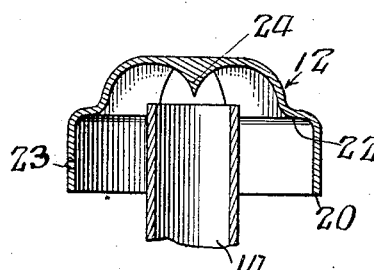
Fig. 2.
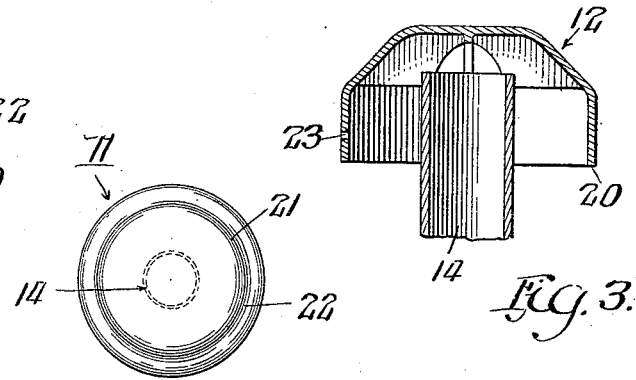
Witnesses:
F. H. Alfeds
G. R. Wilkins
Inventor:
Samuel F. Miller
by Poole & Brown
Attys ced end thereof and said reduced

UNITED STATES PATENT OFFICE.

SAMUEL F. MILLER, OF CHICAGO, ILLINOIS.

SIPHON.

No. 931,453.

Specification of Letters Patent.

Patented Aug. 17, 1909.

Application filed July 15, 1908. Serial No. 443,589.

*To all whom it may concern:*

Be it known that I, SAMUEL F. MILLER, a citizen of the United States, and a resident of Chicago, in the county of Cook and State of Illinois, have invented certain new and useful Improvements in Siphons; and I do hereby declare that the following is a full, clear, and exact description thereof, reference being had to the accompanying drawings, and to the numerals of reference marked thereon, which form a part of this specification.

This invention relates to improvements in automatic deep seal siphons, and refers more specifically to that form of siphons, the intake limb of which consists of a downwardly opening bell which is supported over the outlet limb of the siphon.

Among the objects of the invention is to so construct and arrange the bell, constituting the intake limb of the siphon of this type, as to insure the removal or sweeping out of all of the air from the upper part of the bell when the liquid first begins to flow through the siphon, and thus avoid subsequent irregularities of action in the siphon due to the presence of a body of air locked therein.

A further object of the invention is to render it practicable to operate siphons of all practical sizes with a comparatively small loss of head, relatively to the area of the siphon, while at the same time providing for the complete sweeping of the air from the upper part of the siphon during the beginning of the flow of the liquid therethrough.

The invention consists in the matters hereinafter set forth and more particularly pointed out in the appended claims.

In the drawings:—Figure 1 is a vertical, sectional view of a siphon embodying my invention, showing the same in its proper relation to a tank or receptacle which it is designed to empty. Fig. 2 is a top plan view of the siphon. Fig. 3 is a sectional view of the siphon separate from other parts, showing another form of siphon bell embodying the main features of my invention. Fig. 4 is a like view, showing still another form of siphon bell embodying my invention.

As shown in the drawings, 10 designates a tank designed to be supplied with liquid from any suitable source and adapted to be automatically emptied through a siphon, designated as a whole by 11. The said siphon comprises a bell 12 which constitutes the intake limb of the siphon, an outlet limb 14, over the open upper end of which the bell is suitably supported, and a deep seal trip 15 through which said outlet limb discharges. The outer side or limb of said trap discharges its contents into a pipe 17. The said outlet limb of the siphon and its trap are herein shown as made of the usual construction but may, so far as my present invention relates, be constructed in any other preferred manner, and may be associated with supplemental or auxiliary trap devices if desired.

My invention relates to the form and arrangement of the bell 12 constituting the intake limb of the siphon. In accordance with my invention the bell is made of larger horizontal area at its lower end than at its top, said bell being substantially reduced in area between the upper and lower parts thereof. The reduction of the bell preferably occurs below the upper end of the outlet limb of the siphon and at or near the level to which the liquid rises in the bell to depress the liquid in the inner side or limb of the trap to a level at which the air may escape from the siphon and trap around the lower bend of the trap to start the flow of liquid through the siphon.

As shown in Figs. 1 and 2, 20 designates the lower, larger end of the bell, 21 the upper reduced end thereof and 22 a shoulder between the larger and reduced ends of the bell. The said upper end of the bell may be symmetrically reduced relatively to the lower larger end thereof and said reduced portion is located symmetrically over the open end of the outlet limb of the siphon. The said bell may be provided near its lower margin with a familiar form of sniff or vent hole 23 through which the siphon may be vented, or the siphon may be provided with other forms of venting device.

Heretofore it has been the practice to make the intake limb or bell of this type of siphon of substantially uniform diameter from the top to the bottom thereof. A serious difficulty is encountered in such prior siphons, especially with the larger sizes thereof, by reason of the fact that the interior space within the upper part of the bell is materially larger in diameter than the space actually occupied by the current of water as its flows over the upper edge of the outlet leg of the siphon, so that an annular space remains in the upper part of the bell which is unfilled with water and in which remains a body of air during the flow of water through the siphon. In other words, in such prior bells the current of water does not completely fill the bell in such manner as to sweep all the air out of the upper part of the bell, because of the fact that the air in the upper part of the bell and adjacent to the vertical wall of the bell is not in the direct path of the current, and is not swept out by the latter, but remains during the operation of the siphon. The presence of the air in the bell has an effect to impair or modify the action of the siphon in a manner to decrease the rate of flow of liquid through the siphon and render the action of the siphon irregular. In my improved construction the receiving limb or bell is made of such diameter or horizontal area in its lower part as to admit to the bell the volume of liquid required to displace the liquid seal in the inner side or limb of the trap, and is reduced in diameter, above the level to which the liquid rises in the bell as required to depress the liquid seal in the trap sufficiently to permit the escape of air beneath the lower bend of the trap. I am thereby enabled to utilize the full height of the larger area of the bell to effect the displacement of the liquid in the trap to the point of breaking the seal, and may make said larger part of the bell or any practical diameter or area to effect this result with a comparatively small loss of head. By reason of the reduction of the diameter of the upper end of the bell or receiving limb of the siphon, the sudden rush of water therethrough into the intake limb of the siphon, when the seal is broken, affords a solid or unbroken body of water which entirely fills the upper part of the bell around the open end of the outlet limb of the siphon and which has a substantially uniform velocity of flow throughout the annular space between the top of the outlet limb and the surrounding upper part of the bell and effectively sweeps the air from the bell to the outlet limb of the siphon.

In a siphon of large capacity, requiring displacement of a large volume of liquid in the trap to set the siphon in operation, the bell requires to be made of corresponding capacity. This may be effected by elongating the bell or intake limb, or by making it of large diameter. The elongation of the bell or intake limb to provide the required capacity is not always practicable, as the local conditions may be such as to prohibit the loss of head required to operate a siphon requiring a considerable rise of liquid in the bell. I thereafter make the lower part of the bell relatively shallow and large in diameter, in order to provide the required capacity, and make the upper part of the bell of materially smaller diameter in order to insure that all of the air shall be dislodged therefrom at the time the water begins to flow through the siphon, as hereinbefore stated. By the use of the construction and arrangement of the bell described I am enabled to considerably reduce the height of the bell, relatively to a practical bell of uniform diameter and of like capacity, and am enabled to correspondingly reduce the head required to break the seal of the siphon. It will thus be seen that I am able to operate a siphon of a given size with a considerably less loss of head than is practicable in the use of the prior siphons referred to.

With my construction it may be observed that the diameter of the intake limb or bell may be as large as the conditions require to provide the necessary capacity to displace the liquid in the trap of the siphon. By reducing the upper end of the bell, however, the complete sweeping of the air from the siphon is assured, as hereinbefore described.

In the preferred construction shown in Figs. 1 and 2, a shoulder is formed between the lower part of the bell, which is of larger diameter, and the upper part, which is of smaller diameter; the annular space between the top of the discharge limb and the surrounding smaller part of the bell being not materially larger than is necessary to permit the free flow into the intake limb of the water at the maximum capacity of the siphon. According to the preferred construction shown in said Figs. 1 and 2, the top wall of the bell is joined to the cylindric side wall thereof by a rounded portion, the curvature of which corresponds substantially with a circular arc, the center of which is at or near the upper margin of the outlet limb; this construction serving to make the shape of the interior of the bell conform to the shape of the moving current of water flowing over the upper edge of the outlet limb of the siphon, and insuring that substantially all of the air will be swept from the interior of the bell in the first rush of water through the siphon.

While the special form of bell shown in Figs. 1 and 2 is preferred for the reasons stated, yet a bell embodying the main features of my invention may be modified in form from that shown in said figures. As, for instance, a bell well adapted to secure the principal results set forth may be made as shown in Fig. 3, wherein the bell is made smaller in its upper part by making it upwardly tapered or conical above the horizontal line reached by the water at the time the liquid seal in the inner limb of the trap has been displaced.

A further improvement in a bell of this character described is shown in Fig. 4. In this instance, the top wall of the bell is provided with a central, depending conical part 24, the point or apex of which is directed downwardly and is vertically over the center of the outlet limb 14. The conical projection arranged as shown serves to further provide for the complete removal of air from the interior of the bell, by filling the central conical space unoccupied by the water which rises into the upper part of the bell and pours over the top edge of the outlet limb. The said conical projection is preferably made of rounded or concave form, and when said conical projection is employed in connection with a bell, the interior of which has a rounded, interior upper surface, as shown in Figs. 1, 2 and 3, the concave surface of the conical projection will form a curved continuation of the rounded surface joining the side and top walls of the bell; it being preferred to make the cross-sectional contour of the inner surface of the bell conform approximately to a circular arc, the center of which is located at or near the upper edge of the outlet limb. When the bell is so shaped, the current of water which rises in the bell and flows into the outlet limb as it passes over said upper edge of the outlet limb will completely fill the space between said upper edge and the concave inner surface of the bell, and will thereby sweep with it all of the air therein contained.

I claim as my invention:—

1. In a combined siphon and trap in which the outlet limb of the siphon discharges into the trap, a siphon whose intake limb consists of a downwardly opening bell arranged over the outlet limb of the siphon, said bell being sharply decreased in interior dimensions approximately at the line to which the liquid rises in the bell to effect the breaking of the seal in the trap in a manner to substantially reduce the bore of the intake limb for the passage of water above said line.

2. A siphon trap whose intake limb consists of a downwardly opening bell located over the outlet limb of the siphon, said bell being interiorly substantially smaller in size above than below the line to which the liquid rises in said bell to effect the breaking of the seal in the trap, and being provided with a shoulder between its smaller upper and larger lower parts.

3. A siphon whose intake limb consists of a downwardly opening bell arranged over the outlet limb of the siphon, said bell being interiorly substantially smaller at its upper than at its lower part, and being provided with a shoulder between said smaller upper and larger lower parts, the interior surface of its said smaller upper part being curved to conform substantially to a circular arc, the center of which is located at or near the upper edge of the said outlet limb.

4. A siphon whose intake limb consists of a downwardly opening bell located over the outlet limb of the siphon, said bell being interiorly substantially smaller at its upper than at its lower part, and provided with a shoulder at the junction of said smaller upper and larger lower parts, and the interior surface of the smaller upper part between said shoulder and the top wall of the bell being curved to conform substantially to a circular arc, the center of which is located near the upper edge of said outlet limb.

5. In a combined siphon and trap in which the outlet limb of the siphon discharges into the trap, a siphon whose intake limb consists of a downwardly opening bell arranged over the outlet limb of the siphon, said bell being sharply decreased in interior dimensions approximately at the line to which the liquid rises in the bell to effect the breaking of the seal in the trap in a manner to substantially reduce the bore of the intake limb for the passage of water above said line, said bell having its top wall provided with an interior, central, downwardly tapering projection.

6. In a combined siphon and trap in which the outlet limb of the siphon discharges into the trap, a siphon whose intake limb consists of a downwardly opening bell arranged over the outlet limb of the siphon, said bell being sharply decreased in interior dimensions approximately at the line to which the liquid rises in the bell to effect the breaking of the seal in the trap in a manner to substantially reduce the bore of the intake limb for the passage of water above said line, said bell having its top wall provided with an interior, central, downwardly tapering projection, the interior surface of said smaller upper part of the bell, including the surface of said projection, being curved to conform substantially to a circular arc, the center of which is located at or near the upper margin of said outlet limb.

7. A siphon whose intake limb consists of a downwardly opening bell located over the outlet limb of the siphon, said bell being interiorly substantially smaller at its upper than at its lower part and provided with a shoulder at the junction of said smaller upper and larger lower parts and, on its top wall, with a central, depending, conical, downwardly tapering projection, the inner surface of said smaller upper part, including that of said conical projection, being shaped to conform substantially to a circular arc, the center of which is located at or near the upper margin of said outlet limb.

In testimony, that I claim the foregoing as my invention I affix my signature in the presence of two witnesses, this ninth day of July, A. D. 1908.

SAMUEL F. MILLER.

Witnesses:
GEORGE R. WILKINS,
T. H. ALFREDS.